(12) United States Patent
Vik et al.

(10) Patent No.: US 9,373,856 B2
(45) Date of Patent: Jun. 21, 2016

(54) METHOD OF RECYCLING AND TAPPING OFF HYDROGEN FOR POWER GENERATION APPARATUS

(75) Inventors: Arild Vik, Blomsterdalen (NO); Arne Raheim, Hamar (NO)

(73) Assignee: ZEG POWER AS, Kjeller (NO)

( * ) Notice: Subject to any disclaimer, the term of this patent is extended or adjusted under 35 U.S.C. 154(b) by 0 days.

(21) Appl. No.: 13/160,164

(22) Filed: Jun. 14, 2011

(65) Prior Publication Data

US 2011/0244341 A1    Oct. 6, 2011

Related U.S. Application Data

(63) Continuation of application No. 10/527,971, filed as application No. PCT/GB03/03969 on Sep. 15, 2003, now abandoned.

(30) Foreign Application Priority Data

Sep. 13, 2002 (GB) .................................. 0221304.9

(51) Int. Cl.
*H01M 8/06* (2006.01)
*H01M 8/04* (2016.01)
*H01M 8/12* (2016.01)

(52) U.S. Cl.
CPC ...... *H01M 8/04164* (2013.01); *H01M 8/04097* (2013.01); *H01M 8/0625* (2013.01); *H01M 8/0662* (2013.01); *H01M 2008/1293* (2013.01); *Y02E 60/50* (2013.01); *Y02E 60/523* (2013.01); *Y02E 60/525* (2013.01)

(58) Field of Classification Search
CPC .................. H01M 2008/1293; H01M 8/04089; H01M 8/0618; H01M 8/0662; H01M 8/0668; H01M 8/04097; H01M 8/04164; H01M 8/0625; Y02E 60/523; Y02E 60/50; Y02E 60/525
USPC .................. 429/408, 412, 414, 415, 443, 411
See application file for complete search history.

(56) References Cited

U.S. PATENT DOCUMENTS

| | | | |
|---|---|---|---|
| 2,781,248 A | 2/1957 | Gorin | |
| 5,079,103 A | 1/1992 | Schramm | |
| 6,280,865 B1 * | 8/2001 | Eisman et al. | ................ 429/411 |
| 6,423,435 B1 | 7/2002 | Autenrieth et al. | |

(Continued)

FOREIGN PATENT DOCUMENTS

| | | |
|---|---|---|
| BE | 881637 | 5/1980 |
| WO | WO 01/42132 | 6/2001 |

(Continued)

*Primary Examiner* — Gary Harris
(74) *Attorney, Agent, or Firm* — Diederiks & Whitelaw, PLC (57) ABSTRACT

A power generation apparatus comprises a fuel cell and a reforming module, wherein the reforming module is adapted to reform hydrocarbon fuel into hydrogen and other components, and to separate the hydrogen from the other components. The apparatus is arranged so that the hydrogen is fed from the reforming module to the anode of the fuel cell. Carbon dioxide may be separated in the reforming module. Hydrogen may be recycled from the anode outflow back to the anode and/or tapped off. The apparatus may also contain a desorption module for releasing carbon dioxide. The absorption and release of carbon dioxide may be integrated and the carbon dioxide absorbent and/or desorbent may be recycled. Components of the apparatus may be thermally integrated. The apparatus may be used to generate electricity and produce hydrogen.

20 Claims, 3 Drawing Sheets

(56) References Cited

U.S. PATENT DOCUMENTS

| | | |
|---|---|---|
| 6,531,243 B2 | 3/2003 | Thom |
| 6,777,119 B2 | 8/2004 | Demissie et al. |
| 6,887,607 B1 | 5/2005 | Scholten et al. |
| 7,041,272 B2 | 5/2006 | Keefer et al. |
| 7,045,229 B2 | 5/2006 | Kobayashi et al. |
| 7,087,331 B2 | 8/2006 | Keefer et al. |
| 2002/0061431 A1* | 5/2002 | Koyama et al. ............... 429/33 |
| 2002/0085967 A1* | 7/2002 | Yokota ........................ 422/198 |
| 2002/0122969 A1* | 9/2002 | Herrmann ..................... 429/34 |
| 2002/0136939 A1* | 9/2002 | Grieve et al. ................. 429/23 |
| 2003/0129462 A1 | 7/2003 | Yang et al. |
| 2003/0143448 A1* | 7/2003 | Keefer ......................... 429/26 |

FOREIGN PATENT DOCUMENTS

| | | |
|---|---|---|
| WO | WO 01/97311 | 12/2001 |
| WO | WO 02/15295 | 2/2002 |

* cited by examiner

METHOD OF RECYCLING AND TAPPING OFF HYDROGEN FOR POWER GENERATION APPARATUS

CROSS-REFERENCE TO RELATED APPLICATIONS

This application is a continuation of U.S. patent application Ser. No. 10/527,971, filed Oct. 13, 2005 now abandoned which represents a National Phase of International Application No. PCT/GB2003/003969, filed on Sep. 15, 2003, which claims priority from Great Britain Patent Application No. 0221304.9, filed on Sep. 13, 2002.

BACKGROUND OF THE INVENTION

This invention relates to power generation apparatus containing fuel cells and particularly, but not exclusively, to apparatus which allow the co-production of hydrogen as well as electricity.

There is an ever increasing need to produce power as efficiently and cleanly as possible. Of particular concern is the discharge of carbon dioxide into the atmosphere. This is widely recognised to contribute to global warming and thus efforts are made to reduce carbon dioxide emissions into the atmosphere. One way of achieving this is of course to increase the efficiency with which power is generated from fuel. Another potential way of reducing carbon dioxide emissions into the atmosphere is to capture and store the carbon dioxide produced by the power generation process. This is problematic in conventional power generation systems based on combustion in air, however, since the carbon dioxide in the combustion products is mixed with a large amount of nitrogen. The presence of nitrogen makes the capture and separation of carbon dioxide significantly more expensive.

In recent years there has been a lot of interest in fuel cells which are devices which are able to generate an electric current and heat directly from fuel without combustion. The direct generation of electric current means that the efficiency of such devices is not limited by thermodynamic efficiency limits. However, power generation systems based on fuel cells may still produce carbon dioxide.

Most fuel cells operate on gaseous fuel, usually hydrogen ($H_2$), methane ($CH_4$) or carbon monoxide (CO), as well as oxygen ($O_2$). A fuel cell comprises an anode and a cathode separated from each other by an electrolyte. Two types of electrochemical reactions occur: oxidation half-reaction(s) at the anode and reduction half-reaction(s) at the cathode. Typically, hydrogen (which may have been produced in situ from natural gas or other fuel in a process known as "reforming") undergoes electrochemical reaction at the anode, oxygen (which may be supplied in the form of air) undergoes electrochemical reaction at the cathode and the net reaction provides water and generates electrical power. Other components, such as methane or carbon monoxide, may also be present in the inflow to the fuel cell, particularly where the hydrogen is prepared by natural gas steam-reforming or coal gasification. This means that as well as water, there may be other products such as carbon dioxide.

There are several types of fuel cell, some of which are described below.

PEM (Polymer Electrolyte Membrane or Proton Exchange Membrane) cells operate at low temperatures (60-100° C.). The electrolyte is a solid, flexible polymer. Hydrogen cations pass from the anode to the cathode. Platinum catalysts are used on both the cathode and anode. Water is produced at the cathode.

PAFC (Phosphoric Acid Fuel Cells) operate at moderate temperatures (150-200° C.). The electrolyte is a phosphoric acid matrix. Hydrogen cations pass from the anode to the cathode. Platinum catalysts are used on both the cathode and anode. A small amount of carbon monoxide in the hydrogen in-flow may be tolerated. Water is produced at the cathode. The reactions for both PEM fuel cells and PAFCs are:

At anode: $2H_2 \rightarrow 4H^+ + 4e^-$

At cathode: $O_2 + 4H^+ + 4e^- \rightarrow 2H_2O$

Net reaction: $2H_2 + O_2 \rightarrow 2H_2O$

MCFC (Molten Carbonate Fuel Cells) operate at high temperatures (600-1000° C.). The electrolyte is a matrix of carbonates (e.g. Lithium, Sodium, Potassium and/or Magnesium carbonates). Carbonate anions pass from the cathode to the anode, and carbonate anions lost in this way are compensated for by supplying carbon dioxide to the cathode. Carbon monoxide may also be present in the hydrogen in-flow and used as fuel. Water is produced at the anode. The reactions are:

At anode: $2H_2 + 2CO_3^{2-} \rightarrow 2H_2O + 2CO_2 + 4e^-$ (also, if CO present: $2CO + 2CO_3^{2-} \rightarrow 4CO_2 + 4e^-$)

At cathode: $O_2 + 2CO_2 + 4e^- \rightarrow 2CO_3^{2-}$

Net reaction: $2H_2 + O_2 \rightarrow 2H_2O$ (also, if CO present: $2CO + O_2 \rightarrow 2CO_2$)

SOFC (Solid Oxide Fuel Cells) also operate at high temperatures (600-1000° C.). The electrolyte is a solid ceramic compound, e.g. zirconium oxides. Oxide ions pass from the cathode to the anode. Carbon monoxide may again be used as fuel. Water is produced at the anode. The reactions are:

At anode: $2H_2 + 2O^{2-} \rightarrow 2H_2O + 4e^-$ (also, if CO present: $2CO + 2O^{2-} \rightarrow 2CO_2 + 4e^-$)

At cathode: $O_2 + 4e^- \rightarrow 2O^{2-}$

Net reaction: $2H_2 + O_2 \rightarrow 2H_2O$ (also, if CO present: $2CO + O_2 \rightarrow 2CO_2$)

The two most promising types of fuel cell are the Solid Oxide Fuel Cell (SOFC) typically operating at 600-1000° C., and the Proton Exchange Membrane (PEM) fuel cell typically operating at 80° C.

The SOFC may operate on most gaseous hydrocarbon fuels or fuels derived from the reforming of natural gas, diesel, gasoline or the gasification of solid fuels. When carbonaceous fuels are used, the product gases will contain carbon dioxide. In stationary applications the carbon dioxide may be captured and sequestrated, but this is more difficult to realise in mobile applications like cars. Furthermore, the PEM fuel cell most commonly used for mobile applications generally requires purified hydrogen for operation below 150° C.

There remains a need for highly efficient and clean power and hydrogen generation systems to allow for a transition to a sustainable, low pollution use of fossil fuel energy without release of carbon dioxide to the atmosphere.

The separation of carbon dioxide may be realised by different means. One possibility is to use membranes to separate the different species, another is to absorb gases in liquids or solids and desorb the gases separately using pressure swing or temperature swing cycles.

Even though the efficiency of fuel cells is not limited thermodynamically, practically it has proven difficult to achieve efficiencies that approach the theoretical maximum. A number of hybrid systems have utilised the excess heat generated by an SOFC in a turbine or other machinery. However, these systems are complex, and the total efficiency is limited by the thermodynamic machinery.

One proposal is disclosed in U.S. Pat. No. 5,079,103. This document recognizes that hydrogen may be present in the gases exiting the anode of fuel cells such as MCFCs or SOFCs and, rather than using this for low-quality power generation (e.g. by combustion), seeks to separate it and carbon dioxide from the waste gas and utilize it more efficiently. The hydrogen may be separated from the waste gas by means of pressure swing absorption (PSA) and recycled back to the anode. The carbon dioxide may also be separated from the anode waste gas and, in the case of MCFCs, channelled to the cathode, thereby reducing the requirement for externally supplied carbon dioxide. The carbon dioxide may be separated from the anode waste gas by a scrubbing step or by PSA. Thus, this document discloses that recycling the hydrogen and carbon dioxide in this way provides more energy than simply burning the anode waste gas. The document also discloses, as anode feed stream, natural gas which is internally reformed to hydrogen. Because natural gas is used, desulphurization may be required and recycling the hydrogen can assist with this. However, although this document claims overall efficiencies of up to 70%, this is still some way below the theoretical maximum. Furthermore, because carbon dioxide removal is carried out on the outflow from the fuel cell, large volumes of gas have to be cleaned.

US 2001/0010873 discloses an SOFC wherein a hydrocarbon-containing fuel is introduced to a fuel cell and converted therein to a synthesis gas (an endothermic reaction). The synthesis gas then undergoes partial electrochemical reaction (an exothermic reaction) thereby generating electricity. The hydrocarbon-containing fuel is supplied in such an excess that no additional cooling of the fuel cell is required, i.e. production of the synthesis gas is sufficiently endothermic to counter-balance the exothermic electrochemical reaction. This document teaches using natural gas to which water has been added as the hydrocarbon-containing fuel. The conversion of methane and water to hydrogen and carbon dioxide occurs within the fuel cell before the electrochemical reaction. The process of US 2001/0010873 suffers from several problems. Firstly, it does not satisfactorily address the problem of efficient use of fuel. Secondly, it does not provide an efficient process for separation of the exhaust material. Thirdly, in order to avoid coking, the amount of oxygen must be kept low and this limits the electrochemical potential. This results in below optimum performance with respect to electrical efficiency and power density.

WO 02/15295 discloses a fuel cell generator in which the depleted fuel from a first fuel cell chamber is further used in a second fuel cell chamber to increase the fuel utilisation, to produce an exhaust gas that contains essentially carbon dioxide and water for further treatment so that carbon dioxide can be separated and is not vented into the atmosphere. However, this system does not utilise the carbon dioxide separation system to increase the electrical efficiency further than what is obtained by the increased fuel utilisation.

"SOFC Efficiency at non standard conditions", Electrochemical Proceedings Volume 97-18, presents theoretical considerations for SOFC systems with high efficiency, and suggests the circulation of anode gas with condensation of water and recycling of hydrogen as a means for obtaining high efficiencies in hydrogen fuelled systems. Although improved electrical efficiencies may be realised by this theoretical concept, this can only be done by reducing the power density, since a very high cell potential is required. This paper does not disclose systems which exhibit both high efficiency and high power density.

U.S. Pat. No. 2,781,248, BE 881637 and other documents disclose systems for the manufacture of hydrogen using calcium oxide as a carbon dioxide absorbent.

Whilst the use of anode gas recycling to improve the efficiency of a fuel cell system, and the use of calcium oxide/calcium carbonate cycles for the manufacture of hydrogen are known, there remains a need for improvements with respect to electrical efficiency, power density, carbon dioxide separation and parasitic losses.

SUMMARY OF THE INVENTION

From a first aspect, the invention provides a power generation apparatus comprising a fuel cell and a reforming module, wherein the reforming module is adapted to reform hydrocarbon fuel into hydrogen and other components, and to separate said hydrogen from said other components, the apparatus being arranged so that said hydrogen is fed from the reforming module to the anode of the fuel cell.

Thus it will be seen that in accordance with the present invention hydrogen is produced and separated prior to entering the fuel cell. Separating the hydrogen before entering the fuel cell is advantageous because it allows an increase in the electrochemical potential (voltage) of the fuel. The presence of carbon dioxide or water reduces the voltage. Furthermore, separation prior to the fuel cell eases the processing and manipulation of the separated components.

In the broadest aspect of the invention the hydrogen-containing stream fed from the reforming module to the anode may still contain some carbon dioxide. Preferably however it contains no more than 10 mol % of carbon dioxide, preferably no more than 5 mol % of carbon dioxide, more preferably no more than 1 mol % of carbon dioxide, more preferably no more than 0.1 mol % of carbon dioxide, most preferably no or substantially no carbon dioxide. This allows the voltage to be even higher, and makes the components even easier to process and manipulate as desired, compared to conventional systems. This is particularly useful where efficient separation and/or sequestration of carbon dioxide is desirable.

Preferably the hydrogen-containing stream fed to the anode contains no or substantially no other components, apart from water. More preferably, no or substantially no water is present.

References herein to water are intended to include water in any state, i.e. liquid, vapour etc.

The other components from which the reforming module is arranged to separate hydrogen will depend upon the fuel used and the method of reforming. Suitable fuels include hydrocarbon fuels, particularly those requiring heat for their reforming reaction. Examples of suitable fuels are natural gas, methane, methanol, diesel, gasoline, coal, biomass, gases from the gasification of organic matter such as biomass or carbons/hydrocarbons, gases from the biological decomposition of organic matter such as biomass or carbons/hydrocarbons, and gas-hydrates. Any suitable method of reforming may be used; one suitable method is steam reforming.

In the broadest aspect of the invention the hydrogen-containing stream fed from the reforming module to the anode may also contain some contaminants. Preferably however it contains at least 90% hydrogen, more preferably at least 95% hydrogen, more preferably at least 99% hydrogen, more preferably at least 99.9% hydrogen, where the percentages specified are mol %. Most preferably it contains no or substantially no other components apart from hydrogen. This further enhances the voltage and eases the processing and manipulation. This is because, in most types of fuel cell, where hydrogen is the only anode inflow, the only anode outflows will be hydrogen and, to the extent that electrochemical reaction has occurred, water.

However, the presence of some nitrogen (for example, due to it being present in natural gas fuel) may be tolerated since this will not affect the voltage.

Where water is present in the anode outflow it may be possible in accordance with the invention for it to remain at the final stage of processing. Preferably, however, means are provided for removing water from the anode outflow stream, for example a condenser or a water absorption unit may be used. This further allows an increase in the electrochemical potential (voltage) of the fuel and also makes the resultant stream easier to manipulate and utilise.

Hydrogen produced at the output of the fuel cell in accordance with the invention may all be tapped off for use in a separate process. This has clear benefits since purified hydrogen is a valuable commodity in many applications. Preferably however the apparatus of the present invention is arranged to, or to be able to, recycle at least some hydrogen back to the inlet of the fuel cell. An increased level of efficiency is obtainable by recycling the hydrogen in the anode waste gas back to the anode, as is described hereinabove, whilst still allowing the possibility of some hydrogen being tapped off.

The amount of hydrogen recycled back to the anode compared to the amount of hydrogen tapped off is preferably variable. This means that the preferred apparatus has a large degree of operational flexibility. The amount of hydrogen tapped off could, for example, be varied in a wide range between zero and all or substantially all of the hydrogen in the anode outflow, depending on particular requirements. For example the ratio of hydrogen recycled to hydrogen tapped off may be 100:0, 95:5, 90:10, 75:25, 50:50, 25:75, 5:95 or 0:100.

Conventional SOFC systems have significant shortcomings. In particular, where the cell voltage of a conventional SOFC is high, the fuel utilisation is reduced because the electrochemical potential of the fuel needs to be higher than the cell voltage, and only a fraction of the fuel can be used. Conversely, where the cell voltage of a conventional SOFC is low, the efficiency is low. In contrast, some preferred embodiments of the current invention allow high cell voltage, high efficiency and high fuel utilisation. Alternative preferred embodiments of the current invention allow low cell voltage, high efficiency (since in low cell voltage mode generated heat may be used for the production of hydrogen) and high fuel utilisation. In both types of embodiment the fuel utilisation is high because the fuel is fully utilised for the generation of electricity and/or hydrogen.

In one possible mode of operation according to the invention, water is condensed from the anode exhaust stream, and all the hydrogen in the resultant stream is recycled back to the anode rather than tapped off.

In another possible mode of operation according to the invention, water is condensed from the anode exhaust stream, and all the hydrogen in the resultant stream is tapped off rather than recycled back to the anode.

In a further possible mode of operation according to the invention, water is condensed from the exhaust stream, some of the hydrogen in the resultant stream is tapped off and some of it is recycled back to the anode.

The apparatus may allow flexibility both in the short term and in the long term. For example, if there is an immediate requirement for more purified hydrogen, the amount of hydrogen tapped off may be maximised simply by adjusting the means which direct the hydrogen to be tapped off rather than recycled. Adjustments can also be made to cope with differing loads on the power generation system. For example greater efficiency may be achieved at loads below the maximum by operating at a higher cell voltage at the expense of power density. This is achieved when the hydrogen recycling is controlled to achieve a high partial pressure of hydrogen at the anode. This latter scenario is discussed in more detail below and may be useful where the cost of fuel cells becomes less of a consideration in the future, so that lower power density (i.e. power per cell) is less problematic. It is worth noting, however, that the use of higher hydrogen/water ratios, or operation at higher cell voltages merely represents one of many ways of operating an apparatus in accordance with the invention. Enhanced efficiency may be achieved even when not operated in this way. For example it may be chosen to operate the apparatus in a mode which maximises power density (power produced per cell).

Any known process can be used for reforming the hydrocarbon fuel. Similarly, any known process can be used for separating the thereby produced hydrogen from other components present following reforming.

One method which is compatible with the current invention involves the reaction of methane with water. This produces hydrogen and carbon monoxide (a reforming reaction). The carbon monoxide then reacts with water to produce hydrogen and carbon dioxide (a shift reaction). The carbon dioxide can be separated or absorbed by any known method, e.g. in a scrubbing step, by pressure-swing absorption (for example using an amine), or by reaction with a further component. This allows the production of a separate stream of carbon dioxide, or disposal of carbon dioxide, for example by absorption into a disposable solid. For example, the carbon dioxide can be reacted with a metal oxide, for example a group II metal oxide, e.g. calcium oxide, to produce a metal carbonate (a carbonation reaction). In such a case, the overall reaction of reforming, shift and carbonation may be as follows:

$$CH_4 + 2H_2O + meO \rightarrow 4H_2 + meCO_3$$

wherein me is a metal, e.g. calcium. The carbon dioxide may subsequently be released from the metal carbonate by heating it and this is known as a desorption reaction or where the metal is calcium, a calcination reaction.

Absorption of carbon dioxide may also be achieved by reaction with a metal hydroxide, e.g. a group II metal hydroxide, e.g. calcium hydroxide.

As noted above, carbon dioxide may be released from a metal carbonate in a desorption reaction. The apparatus of the current invention therefore comprises, in some preferred embodiments a module which is adapted to allow desorption to take place.

Where provided for, the carbonation and desorption reactions may occur in separate modules. For example, the reforming module may be adapted so that reforming, shift and carbonation occur therein to produce hydrogen and sequestered carbon dioxide (in the form of a metal carbonate), and there may be a separate desorption module adapted to release carbon dioxide from the metal carbonate. This has the advantage that metal oxide from the desorption module may be transferred to the reforming module, and metal carbonate from the reforming module may be transferred to the desorption module at an appropriate time. This reduces the need for a metal carbonate to be bought in. It also allows the production of carbon dioxide which is itself of value as a commodity, or as a component to be supplied to the cathode of MCFC fuel cells. Of course, these advantages are supplementary to the major environmental advantages of carbon dioxide separation according to the invention.

In a further embodiment, the reforming modules and the desorption module may be linked, so that the metal carbonate produced by the former is desorbed by the latter. This is desirable in terms of efficiency and ease of use.

According to a further embodiment means are provided for switching flow to the reforming module to the desorption module and/or for switching flow to; the desorption module to the reforming module. In this way the reforming module may also function as a desorption module and/or the desorption module may also function as a reforming module. For example, the flows to the reforming-module and desorption module may be switched for appropriate time periods. This allows, for example, the carbon dioxide absorbed in the reforming module during reforming to be subsequently released by channelling the cathode outflow through the reforming module and/or the carbon dioxide released from the desorption module to be subsequently replaced by channelling the fuel input through the desorption module. Other advantages of this system include the ease of re-utilisation of the carbon dioxide absorbent.

Other possible alternatives for separating the hydrogen produced in the reformer from the other components present include the use of a hydrogen permeable membrane.

In the broadest scope of the invention the reforming module and the fuel cell may be entirely separate from one another save for the provision of hydrogen from the former to the latter. More preferably though the reforming module is thermally integrated with the fuel cell. This results in the net exothermic nature of the electrochemical reactions being at least partially balanced with the net endothermic nature of the non-electrochemical reactions which occur in the reforming module. The integration may be achieved through a close physical proximity between the elements or through heat transfer means which could comprise a solid, liquid or gas transfer medium.

Similarly, where there is a separate desorption module as described previously it is preferably thermally integrated with the fuel cell. This results in the net exothermic nature of the electrochemical reactions being at least partially balanced with the net endothermic nature of the non-electrochemical reactions which occur in the desorption module. Again physical proximity or a transfer medium may be used.

Preferably, therefore, the reforming module, the fuel cell and the desorption module are thermally integrated with each other, most preferably by heat transfer means between the fuel cell and reforming module, and heat transfer means between the fuel cell and desorption module. In a further envisaged embodiment, there are also heat transfer means between the reforming module and the desorption module.

In one preferred example, the heat transfer means comprise heat transfer loops, e.g. loops which route the cathode exhaust via the reforming and/or desorption module, loops which route the anode exhaust via the reforming and/or desorption module. This is particularly useful for utilising the high temperature "waste" heat of SOFC systems. Where the anode or cathode exhausts are routed in this way, in one embodiment the exhaust components are physically separated from the reforming and/or desorption modules, thereby interacting only in a thermal, as opposed to a chemical, manner. In another embodiment, where the heat transfer loop is an anode exhaust loop, the exhaust components are simply fed into the reforming module such that they can interact chemically as well as thermally in the reforming module. Thus, for example, the water required for the reforming reaction is preferably taken directly or indirectly from the anode exhaust loop.

As noted above, the anode exhaust may be recycled back to the anode. The same applies to the cathode exhaust which may be recycled back to the cathode via the reforming and/or desorption modules. Such cathode flow recycling aids the removal of excess heat from the fuel cell. The amount of cathode flow required to remove the heat would normally be greater than the amount of flow required for the electrochemical reaction. However, this allows the air to be cycled several times, thereby reducing the need for air from the outside and reducing the amount of air emitted. In one example, the heated cathode exhaust is cooled by about 50 to 200° C. in the calcination reactor and recycled to the stack where it is heated by about 50 to 200° C. before continuing around the loop, a fraction of the air in the cathode loop being replaced for the electrochemical reaction.

Efficient heat transfer in this way has the result that neither the cooling effect of the non-electrochemical reactions, nor the heating effect of the electrochemical reactions, are wasted. Where the electrochemical reactions are more exothermic than the non-electrochemical reactions are net endothermic, preferably substantially all the cooling energy of the latter are used to cool the electrochemical reactions. Conversely, where the electrochemical reactions are less exothermic than the non-electrochemical reactions are net endothermic, preferably substantially all the energy of the former are used to drive the non-electrochemical reactions.

In this way the preferred embodiment of the invention can provide a power generation system which has an electrical efficiency close to the theoretical, non-thermodynamic, maximum, limited only by small thermal and pressure losses. At the same time, the carbon dioxide separation process can be thermally integrated with the power generation process.

In a further preferred embodiment, reactions which occur in the reforming module (e.g. reforming, shift and carbonation) are themselves thermally integrated with each other, either by virtue of these reactions occurring in close vicinity to each other, or by using additional heat transfer means where necessary. This further enhances the efficiency of the apparatus.

The flexibility of the power generation apparatus has been discussed above. This flexibility allows the apparatus to be operated in accordance with further aspects of the invention.

As technology progresses, the unit cost of fuel cells is reducing and in such modes of operation the current invention seeks in part to take advantage of this. Conventionally, fuel cells are operated at a cell voltage of about 0.7 volts. Operation at a higher cell voltage has hitherto been avoided because this has been associated with a lower power density, i.e. less power produced per fuel cell. The electrical load which may be drawn from the fuel cell exhibits an inverse relationship with the cell voltage.

In contrast, the applicant has appreciated that a lower degree of fuel utilization per cycle, although associated with a lower power density (power produced per cell), allows operation at a higher cell voltage and this in turn gives greater efficiency. Whilst this necessitates provision of more fuel cells, it means that the fuel is used more efficiently to produce power.

Accordingly, from a further aspect, the invention provides a method of operating a fuel cell, comprising recycling hydrogen from the anode outflow back to the anode inlet, such that the fuel cell has a cell operating voltage of at least 0.8 volts.

In accordance with this aspect of the invention therefore, it is feasible to construct a power generation system which is not designed to operate normally at its full capacity without suffering any significant loss in efficiency. It allows however for surges in demand for power to be met, again without significant loss of efficiency. This is a much more practically useful prospect than a system which only achieves its peak efficiency at full load—since in practice a generator is unlikely to be operated at full load for most of the time.

Preferably the method also comprises reforming hydrocarbon fuel to hydrogen and other components, and separating said hydrogen from said other components, in a separate reforming module, and feeding said hydrogen from said reforming module to the anode of the fuel cell. Other preferred features of this aspect are as described for the apparatus above.

Preferably the minimum operating cell voltage is between 0.8 volts and 0.9 volts, more preferably between 0.82 volts and 0.87 volts, most preferably approximately 0.85 volts. This is the voltage that is found to be most effective and practical for efficient fuel utilisation. The actual voltage will depend on specific demands of electricity and hydrogen, and will vary depending on the specific application.

The cell voltage and partial pressure of hydrogen flowing through the anode and recycled are of course related. Therefore, when viewed from a yet further aspect the invention provides a method of operating a fuel cell comprising recycling hydrogen from the anode outflow back to the anode inlet, such that the molar ratio of hydrogen to water in the anode outflow is greater than 0.5, more preferably greater than 1.0 more preferably greater than 10, more preferably greater than 25, more preferably greater than 40.

Preferably the method also comprises reforming hydrocarbon fuel to hydrogen and other components, and separating said hydrogen from said other components, in a separate reforming module, and feeding said hydrogen from said reforming module to the anode of the fuel cell. Other preferred features of this aspect are as described for the apparatus above.

The applicant has appreciated that operating the apparatus at a high cell voltage and/or a high partial pressure of hydrogen at the anode is desirable in certain circumstances.

According to the Nernst equation, the fuel cell potential at the outlet is reduced from the theoretical maximum voltage by an amount that depends on the relative amounts of reactants and products. As the ratio of hydrogen to water increases, a greater fuel cell potential will be possible and the cell will be able to operate at a higher cell voltage.

The fuel cell may be a PEM fuel cell, but is preferably a PAFC fuel cell, or a high temperature fuel cell, most preferably a molten carbonate fuel cell or solid oxide fuel cell (MCFC or SOFC). These fuel cells are energy efficient in combination with the improvements of the current invention and the SOFC system is the most suited to the current invention.

In further aspects, the invention provides methods of generating electrical power, optionally with co-production of hydrogen, using the apparatus described above.

From a further aspect, the invention provides a power generation apparatus comprising a fuel cell, a reforming module and a desorption module, wherein the reforming module is adapted to reform hydrocarbon fuel into hydrogen and carbon dioxide, to separate said hydrogen from said carbon dioxide, and to absorb said carbon dioxide by a carbonation reaction with a metal oxide to produce a metal carbonate, and the desorption module is adapted to allow the release of carbon dioxide from a metal carbonate, the apparatus being arranged so that said hydrogen is fed from the reforming module to the anode of the fuel cell. This provides an integrated system with advantages as described above. Preferred features of this aspect are as described above.

BRIEF DESCRIPTION OF THE DRAWINGS

Certain preferred embodiments of the invention will now be described, by way of example only, with reference to the accompanying schematic drawings in which.

DETAILED DESCRIPTION OF THE INVENTION

Figure 1:
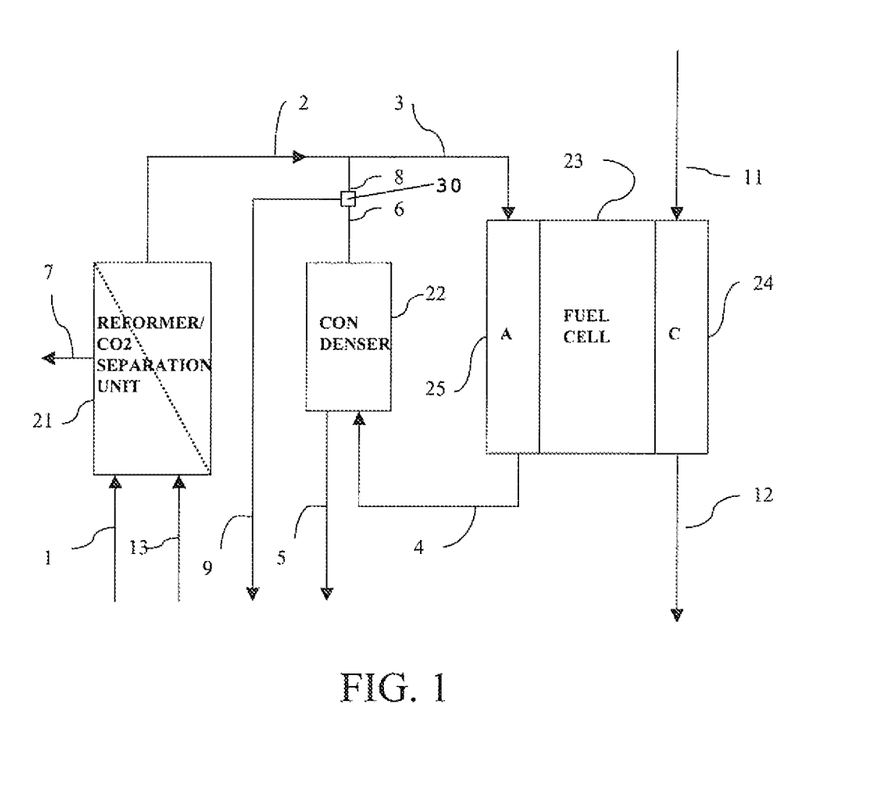
FIG. 1 shows schematically an embodiment of a power generation system in accordance with the present invention.

Discussion of FIG. 1

Turning firstly to FIG. 1, there may be seen a schematic representation of a power generation apparatus which generally comprises a fuel cell module 23, a reforming module 21 and a condenser unit 22.

The fuel cell module 23 comprises a cathode compartment 24 with inlet 11 and outlet 12, and an anode compartment 25 with inlet 3 and outlet 4. Between the anode portion 25 and the cathode portion 24 is an electrolyte as is well known in the art.

The reforming module 21 is provided with a fuel inlet 1 and a water inlet 13. Two outlets 2 and 7 are provided namely a hydrogen outlet 2 and a carbon dioxide outlet 7. The hydrogen outlet 2 from the reforming module 21 is fed to the anode inlet 3 of the fuel cell 23.

The anode outlet 4 of the fuel cell 23 is fed to the condenser 22, provided with a water drain outlet 5 and a de-watered gas outlet 6. Flow from the condenser gas outlet 6 is divided into two channels 8 and 9 by a three-way valve 30. Flow from one of these channels 8 is fed back to the anode inlet 3.

In operation, methane and water are fed into the reforming module 21 by means of inlets 1 and 13 respectively. In the reforming module 21, the methane fuel is reformed into carbon dioxide and hydrogen as follows:

$CH_4 + H_2O \rightarrow 3H_2 + CO$ (reforming reaction)

$CO + H_2O \rightarrow H_2 + CO_2$ (shift reaction)

It will of course be appreciated that the chemical equations discussed in the present application relate to equilibria and that the equilibrium positions will not necessarily be completely to the right-hand (product) side of the equations. For example, the above two reactions may occur only to a partial extent.

The hydrogen is separated from carbon dioxide by passing the resultant mixture thereof through a hydrogen permeable membrane which does not allow the carbon dioxide to pass. The hydrogen then exits the reforming module 21 via the hydrogen outlet 2 whilst the carbon dioxide exits through the other outlet 7 to be stored or reused.

Hydrogen from the outlet 2 enters the anode inlet 3 of the fuel cell. Air is supplied to the cathode via the air inlet 11 and depleted air exits the cathode via the air outlet 12. Electrochemical reaction occurs in the fuel cell to provide an electrical current as is well known.

Water and unreacted hydrogen exit the anode outlet 4 to be fed into the condenser 22. Condensed water leaves the condenser 22 via the drain outlet 5 (which may be used to replenish the supply to the reformer inlet 13). The dewatered hydrogen exits through the other outlet to the three-way valve 30. The valve 30 may be used to determine what proportion of the hydrogen is recycled back to the fuel cell through pipe 8 and therefore how much is tapped off through pipe 9 for external use.

The high electrical efficiency and high total efficiency as well as the flexibility with respect to operating flexibility will be demonstrated by the following Example. For comparison, efficiency and power density calculations are first performed for a conventional state of the art SOFC system. A specific cell resistance of Rc=0.25 ohm*cm2 and a fuel feed of Ff=1.25 mole/second of methane equivalent to 1 MJ/s are assumed for all the systems.
Conventional SOFC System.
A conventional SOFC system is typically operated under the conditions shown below:

| | |
|---|---|
| Cell voltage | Uc = 0.7 V |
| Operating temperature | 1000 C. |
| Fuel utilisation | Fu = 85% |
| Water:hydrogen ratio at inlet (minimum required to avoid soot formation) | 1:9 |
| Electrochemical potential at fuel cell inlet | Ui = 1.00 V |
| Electrochemical potential at fuel cell outlet | Uo = 0.76 V |

Each mole of methane entering the system can free 8 electrons, either directly or indirectly when converted to 4 hydrogen molecules with two electrons each.
Considering also the fuel utilisation, the electrical output of the fuel cell will be Electric output=8*$F$*$Uc$*$Fu$*methane feed rate Where $F$=Faradays constant=96487 coulomb/mole
The electrical efficiency is given by Electrical efficiency=Electrical output/Energy consumed The energy consumed is equal to the heat of formation of the methane entering the system. The heat of formation (lower heating value) of methane is LHV_CH4=802 kJ/mole, and the assumed feed rate is 1.25 mole/s.
With the given values:

Electrical efficiency=(8*96487*0.7*0.85*1.25)/(802000*1.25)=57%

The average electrochemical potential over the cell is $Ua$=0.5*($Ui$+$Uo$), with the given values $Ua$=0.5*(1.00V+0.76V)=0.88V The average power density of the cell will be $Wa$=($Ua$−$Uc$)*$Uc$/$Rc$, with the given values $Wa$=(0.88V−0.7V)*0.7V/0.25 ohm*cm2=504 mW/cm2

The power-density is of significant importance, since the cost of the fuel cells is inversely proportional to the power density.

EXAMPLE

A system corresponding to that shown schematically in FIG. 1 is operated under the conditions shown below:

| | |
|---|---|
| Fuel feed at fuel inlet 1: | Ff = 1.25 mole/s of methane |
| Cell voltage | 0.7 V |
| Operating temperature | 1000 C. |
| Water:hydrogen ratio at inlet (humidified hydrogen, zero carbon content prohibits soot formation) | 3:97 |
| Electrochemical potential at fuel cell inlet | Ui = 1.07 V |
| Electrochemical potential at fuel cell outlet | Uo = 0.85 V |

In this example, half of the hydrogen entering the fuel cell anode chamber is converted electrochemically, while the other half leaves the system as produced hydrogen. Each mole of methane is converted to 4 moles hydrogen in the reformer, hence hydrogen is produced at a rate of 2.5 mole/s and converted electrochemically at a rate of 2.5 mole/s. The net chemical energy consumed in the system is then given by the difference in heating value of the methane fuel stream entering the system and the produced hydrogen fuel stream leaving the system. The heat of formation (lower heating value) of methane is LHV_CH4=802 kJ/mole, the heat of formation (lower heating value) of hydrogen is LHV_H2=242 kJ/mole and the assumed feed rate is 1.25 mole/s.

Energy consumed=(802*1.25−0.5*242*4*1.25)kJ/s=397 kJ/s

Electric output=2*$F$*$Uc$*hydrogen converted

The electrical efficiency is given by

Electrical efficiency=Electrical output/Energy consumed

With the given values:

Electrical eff.=(2*96487*0.7*2.5)/(397)=85%

The average electrochemical potential over the cell is $Ua$=0.5*($Ui$+$Uo$), with the given values $Ua$=0.5*(1.07V+0.85V)=0.96V The average power density of the cell will be $Wa$=($Ua$−$Uc$)*$Uc$/$Rc$, with the given values $Wa$=(0.96V−0.7V)*0.7V/0.25 ohm*cm2=728 mW/cm2

Compared to the conventional system, the electrical efficiency has been improved from 57% to 85% and the power density increased from 504 mW/cm2 to 728 mW/cm2. This represents a substantial improvement.
Discussion of FIG. 2

Figure 2:
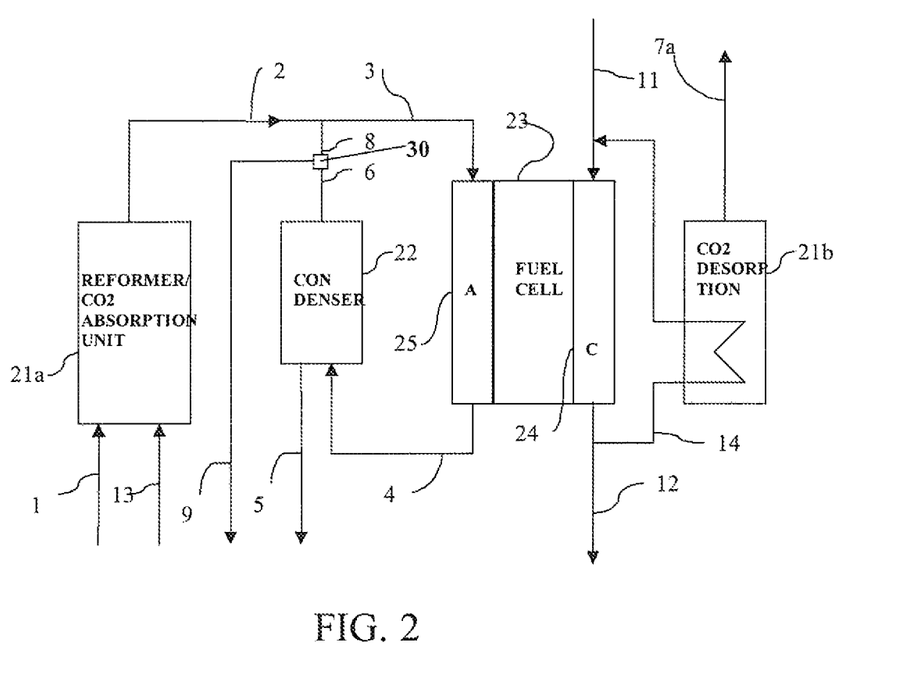
FIG. 2 shows schematically a second embodiment of a power generation system in accordance with the present invention.

In FIG. 2, there may be seen a schematic representation of a power generation apparatus according to a second embodiment of the invention.

The power generation apparatus represented in FIG. 2 differs from the apparatus illustrated in FIG. 1 in that instead of a hydrogen permeable membrane, the reforming module 21*a* is adapted to absorb carbon dioxide. This is subsequently desorbed in a desorption module 21*b*, which therefore has a carbon dioxide outlet 7*a*.

The desorption module 21*b* includes a conduit 14 through it which is connected to the cathode inlet and outlets 11,12 respectively. The exhaust gas flow exiting the cathode at the outlet 12 may be routed via the conduit 14 through desorption module 21*b* back to cathode inlet 11. This allows the heat of the cathode exhaust gases to be used in the endothermic desorption reaction occurring in the desorption module 21*b*. Not only does this obviate the need to supply heat for the desorption module 21*b*, but it reduces the need to cool the fuel cell 23.

It will be appreciated that whilst recycling of the cathode gases via the conduit 14 is shown, this is not essential in order to be able to realise the thermal integration set out above.

The reforming reaction takes place as in the first embodiment:

$$CH_4 + H_2O \rightarrow 3H_2 + CO \text{ (reforming reaction)}$$

$$CO + H_2O \rightarrow H_2 + CO_2 \text{ (shift reaction)}$$

Calcium oxide is then used to absorb the carbon dioxide to produce calcium carbonate:

$$CaO + CO_2 \rightarrow CaCO_3 \text{ (carbonation reaction)}$$

resulting in the following overall reaction:

$$CH_4 + 2H_2O + CaO \rightarrow 4H_2 + CaCO_3 \text{ (integrated reforming \& carbonation)}$$

Utilizing heat from the fuel cell 23 via the conduit 14, carbon dioxide is then desorbed from the carbonate according to $$CaCO_3 + heat \rightarrow CO + CO_2 \text{ (desorption reaction)}$$

and the calcium oxide is then recycled in the process. The desorption reaction is referred to as a calcination reaction.

In this embodiment, the exothermic carbonation reaction is thermally coupled to the endothermic reforming reaction by virtue of both being carried out in the reforming module 21a. The equilibrium of the overall reaction (integrated reforming and calcination) gives 95+% (dry basis) hydrogen at standard (approximately 500° C.) reforming temperatures. The exothermic electrochemical reaction is coupled to the endothermic calcination reaction such that the calcination reaction is almost complete at the high operating temperature of the SOFC.

The reforming module is thermally integrated with the fuel cell (not illustrated). This is advantageous as the fuel cell provides the heat necessary for the endothermic reforming reaction. In one example of an integrated reforming/carbonation reactor, approximately 221 kJ/mol is used for reforming, 174 kJ/mol is released by the carbonation reaction, 38 kJ/mol is released by the shift reaction, and a small amount of heat from the fuel cell is provided to the reforming module.

The above processes allow a particularly efficient carbon dioxide absorption and desorption process in accordance with the principles of the present invention.

Modules 21a and 21b may be separate, as illustrated, which requires the calcium oxide in the reforming module 21a and the calcium carbonate in the desorption module 21b to be replenished periodically. Alternatively, they may be linked, so that the metal carbonate produced by the reforming module 21a is desorbed by the desorption module 21b.

The use of calcium is only illustrative and other metals may be appropriate instead.

Figure 3:
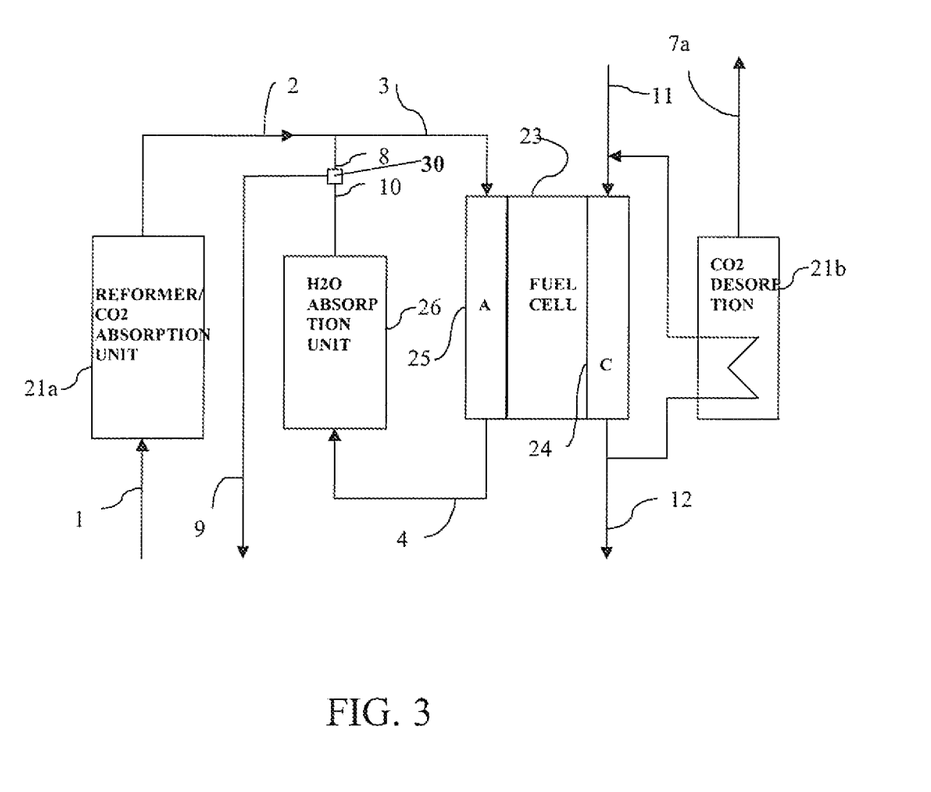
FIG. 3 shows schematically a third embodiment of a power generation system in accordance with the present invention.

Discussion of FIG. 3

In FIG. 3, there may be seen a schematic representation of a power generation apparatus according to a third embodiment. The power generation apparatus represented in FIG. 3 differs from the apparatus illustrated in FIG. 2 in that the reforming module 21a is adapted to absorb carbon dioxide by reaction with a metal hydroxide as well as a metal oxide ("metal" is denoted below as "me"). In addition, rather than using a condenser in the hydrogen recycle loop, a water absorption unit 26, which does not have a water outlet, is used.

In this embodiment the reforming and carbon dioxide absorption reactions are as follows.

$$me(OH)_2 + CH_4 \rightarrow meO + CO + 3H_2$$

$$CO + me(OH)_2 \rightarrow H_2 + meCO_3$$

The water may be absorbed by reaction with a metal oxide:

$$meO + H_2O \rightarrow me(OH)_2$$

Carbon dioxide may be desorbed by the usual process:

$$meCO_3 \rightarrow meO + CO_2$$

Accordingly, this embodiment allows the recycling of reagents because the metal oxide produced in the desorption step may be used in the water absorption step. This produces metal hydroxide which may be used in the reforming and absorption reactions. This in turn produces metal carbonate which reacts to form metal oxide in the desorption step, thereby completing the cycle. This embodiment exhibits high efficiency and prolongs the life of the absorbent and desorbent.

Whilst this embodiment does not require a steamer or condenser, a dryer may be used to remove excess water. This dryer may take the form of a separate water desorption module, through which the hot cathode outflow is channelled (not illustrated).

The invention claimed is:

1. A method of generating power comprising:
   reforming a hydrocarbon fuel into hydrogen and other components,
   separating said hydrogen from said other components, said separated other components being removed from the hydrogen stream,
   wherein the reforming and separating steps are performed upstream of an anode of a fuel cell,
   feeding the separated hydrogen to the anode of the fuel cell,
   recycling hydrogen from an outflow stream of the anode of the fuel cell back to the anode such that the fuel cell has a minimum cell operating voltage of 0.8 volts,
   varying the amount of hydrogen recycled during normal operation to meet an immediate requirement for purified hydrogen or differing electrical load requirements, and
   tapping off for external use hydrogen which is not recycled.

2. The method as claimed in claim 1, comprising feeding substantially nothing except hydrogen to the anode of the fuel cell.

3. The method as claimed in claim 1, comprising removing water from the outflow stream of the anode of the fuel cell.

4. The method as claimed in claim 1, comprising separating carbon dioxide from said hydrogen and said other components, and outputting a stream of said carbon dioxide.

5. The method as claimed in claim 1, comprising absorbing carbon dioxide from said other components or sequestering it into a solid.

6. The method as claimed in claim 1, comprising absorbing carbon dioxide from said other components by a carbonation reaction with a metal oxide or hydroxide to produce a metal carbonate.

7. The method as claimed in claim 1, comprising releasing carbon dioxide from said other components through desorption.

8. The method as claimed in claim 7, further comprising: performing the desorption with a desorption module thermally integrated with the fuel cell.

9. The method as claimed in claim 1, wherein step of reforming the hydrocarbon is thermally integrated with the fuel cell.

10. The method as claimed in claim 1, comprising varying the amount of hydrogen tapped off between zero and all of the hydrogen in the anode outflow.

11. The method as claimed in claim 1, comprising controlling the ratio of hydrogen recycled to hydrogen tapped off to include 100:0, 0:100 and at least one ratio therebetween.

12. The method as claimed in claim 1, comprising varying the ratio of hydrogen recycled to hydrogen tapped off to include 100:0, 95:5, 90:10, 75:25, 50:50, 25:75, 10:90, 5:95 and 0:100.

13. A method of generating power with a power generating system comprising:
reforming a hydrocarbon fuel into hydrogen and other components,
separating said hydrogen from said other components, said separated other components being removed from the hydrogen stream,
wherein the reforming and separating steps are performed upstream of an anode of a fuel cell,
feeding the separated hydrogen to the anode of the fuel cell,
recycling hydrogen from an outflow stream of the anode of the fuel cell back to the anode,
varying the amount of hydrogen recycled during normal operation to meet an immediate requirement for purified hydrogen or differing electrical load requirements,
tapping off hydrogen which is not recycled for use in a separate process, and
operating at a cell voltage of at least 0.8 volts at the expense of power density in the fuel cell and controlling recycling to achieve an increased partial pressure of hydrogen at the anode at loads below a maximum load.

14. The method as claimed in claim 13 further comprising maximising the amount of hydrogen tapped off if there is an immediate requirement for more purified hydrogen.

15. The method as claimed in claim 13 further comprising adjusting the amount of hydrogen tapped off to cope with differing loads on the power generation system.

16. The method as claimed in claim 13, comprising feeding substantially nothing except hydrogen to the anode of the fuel cell.

17. The method as claimed in claim 13, comprising separating carbon dioxide from said hydrogen and said other components, and outputting a stream of said carbon dioxide.

18. The method as claimed in claim 17, comprising absorbing carbon dioxide from said other components by a carbonation reaction with a metal oxide or hydroxide to produce a metal carbonate.

19. The method as claimed in claim 13, comprising releasing carbon dioxide from said other components through desorption and performing the desorption with a desorption module thermally integrated with the fuel cell.

20. The method as claimed in claim 13, wherein the step of reforming the hydrocarbon is thermally integrated with the fuel cell.

* * * * *